US009563800B2

(12) United States Patent
Chen et al.

(10) Patent No.: US 9,563,800 B2
(45) Date of Patent: Feb. 7, 2017

(54) INTELLIGENT ENTRANCE GUARD UNLOCKING SYSTEM AND UNLOCKING METHOD THEREOF

(71) Applicant: HON HAI PRECISION INDUSTRY CO., LTD., New Taipei (TW)

(72) Inventors: Hsin-Nan Chen, New Taipei (TW); Chia-Wei Chang, New Taipei (TW); Wen-Kuei Chou, New Taipei (TW); Kuang-Yao Liao, New Taipei (TW); Chih-Chung Weng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/755,824

(22) Filed: Jun. 30, 2015

(65) Prior Publication Data
US 2016/0225205 A1 Aug. 4, 2016

(30) Foreign Application Priority Data

Feb. 4, 2015 (TW) .............................. 104103797 A

(51) Int. Cl.
*B60R 25/01* (2013.01)
*G06K 9/00* (2006.01)
*G07C 9/00* (2006.01)

(52) U.S. Cl.
CPC ....... *G06K 9/00013* (2013.01); *G07C 9/00007* (2013.01); *G07C 9/00031* (2013.01);
(Continued)

(58) Field of Classification Search
CPC ........... G07C 2009/00095; G07C 2005/00769; G07C 9/00007; G07C 9/00031; G07C 9/00071; G07C 9/00174; G07C 9/00309; G07C 9/00563
(Continued)

(56) References Cited

U.S. PATENT DOCUMENTS 6,661,334 B1 * 12/2003 Ives ..................... G05B 19/048
340/5.53
6,710,700 B1 * 3/2004 Tatsukawa .............. B60R 25/04
340/5.52
(Continued)

FOREIGN PATENT DOCUMENTS

| CN | 1796712 A | 7/2006 |
|---|---|---|
| CN | 101974991 B | 11/2014 |
| TW | M293188 | 7/2006 |

*Primary Examiner* — Carlos E Garcia
(74) *Attorney, Agent, or Firm* — Zhigang Ma

(57) ABSTRACT

An intelligent entrance guard unlocking method includes: transmitting electric energy of a power unit of a intelligent entrance guard in a wireless electromagnetic radiation via a transmit coil; receiving the electric energy via a receiver coil of a powerless smart key; capturing a fingerprint image of an user and storing the fingerprint image in a second storage unit of the powerless smart key; controlling a wireless transmit unit of the powerless smart key to transmit a wireless signal containing the fingerprint image to the intelligent entrance guard; obtaining a predefined fingerprint image from a first storage unit of the intelligent entrance guard and comparing the fingerprint image with the predefined fingerprint image; unlocking the intelligent entrance guard when the fingerprint image matches with the predefined fingerprint image and not unlocking the intelligent entrance guard when the fingerprint image does not match with the predefined fingerprint image.

15 Claims, 3 Drawing Sheets

(52) U.S. Cl.
CPC ..... *G07C 9/00563* (2013.01); *G07C 9/00071* (2013.01); *G07C 9/00174* (2013.01); *G07C 9/00309* (2013.01); *G07C 2009/00095* (2013.01); *G07C 2009/00603* (2013.01); *G07C 2009/00769* (2013.01)

(58) Field of Classification Search
USPC ....... 340/5.1, 5.2, 5.3, 5.31–5.32, 5.52–5.53, 340/5.7, 5.8, 5.81, 541, 542
See application file for complete search history.

(56) References Cited

U.S. PATENT DOCUMENTS

| | | | |
|---|---|---|---|
| 2009/0096580 A1* | 4/2009 | Paananen | G06F 21/35 340/10.1 |
| 2011/0109432 A1* | 5/2011 | Kim | B60R 25/00 340/5.64 |
| 2012/0028575 A1* | 2/2012 | Chen | G06K 19/0705 455/41.1 |
| 2013/0176179 A1* | 7/2013 | Park | H01Q 1/243 343/702 |
| 2014/0183269 A1* | 7/2014 | Glaser | G06F 21/32 235/492 |
| 2015/0123762 A1* | 5/2015 | Park | G07C 9/00182 340/5.51 |
| 2016/0072321 A1* | 3/2016 | Li | H02J 7/0029 455/573 |

* cited by examiner

INTELLIGENT ENTRANCE GUARD UNLOCKING SYSTEM AND UNLOCKING METHOD THEREOF

CROSS-REFERENCE TO RELATED APPLICATIONS

This application claims all benefits accruing under 35 U.S.C. §119 from TW Application No. 104103797, filed on Feb. 4, 2015, in the Taiwan Intellectual Property Office, the disclosure of which is incorporated herein by reference. The application is also related to co-pending applications entitled, "INTELLIGENT ENTRANCE GUARD UNLOCKING SYSTEM AND UNLOCKING METHOD THEREOF" (Ser. Nos. 14/755,867, 14/755,846, 14/755,911, 14/755,887). Such applications have the same assignee as the instant application and are concurrently filed herewith. The disclosure of the above-identified applications is incorporated herein by reference.

FIELD

The subject matter herein generally relates to an unlocking system and an unlocking method for an intelligent entrance guard.

BACKGROUND

In order to control entrance to a room or a device, a security system or admittance system can be implemented. Traditional systems have included a physical key. A physical key requires the operator to maintain possession of the physical key for both entrance and preventing others from entrance. Other systems involve electronic devices that communicate via wired or wireless technology. These systems can include batteries to operate.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
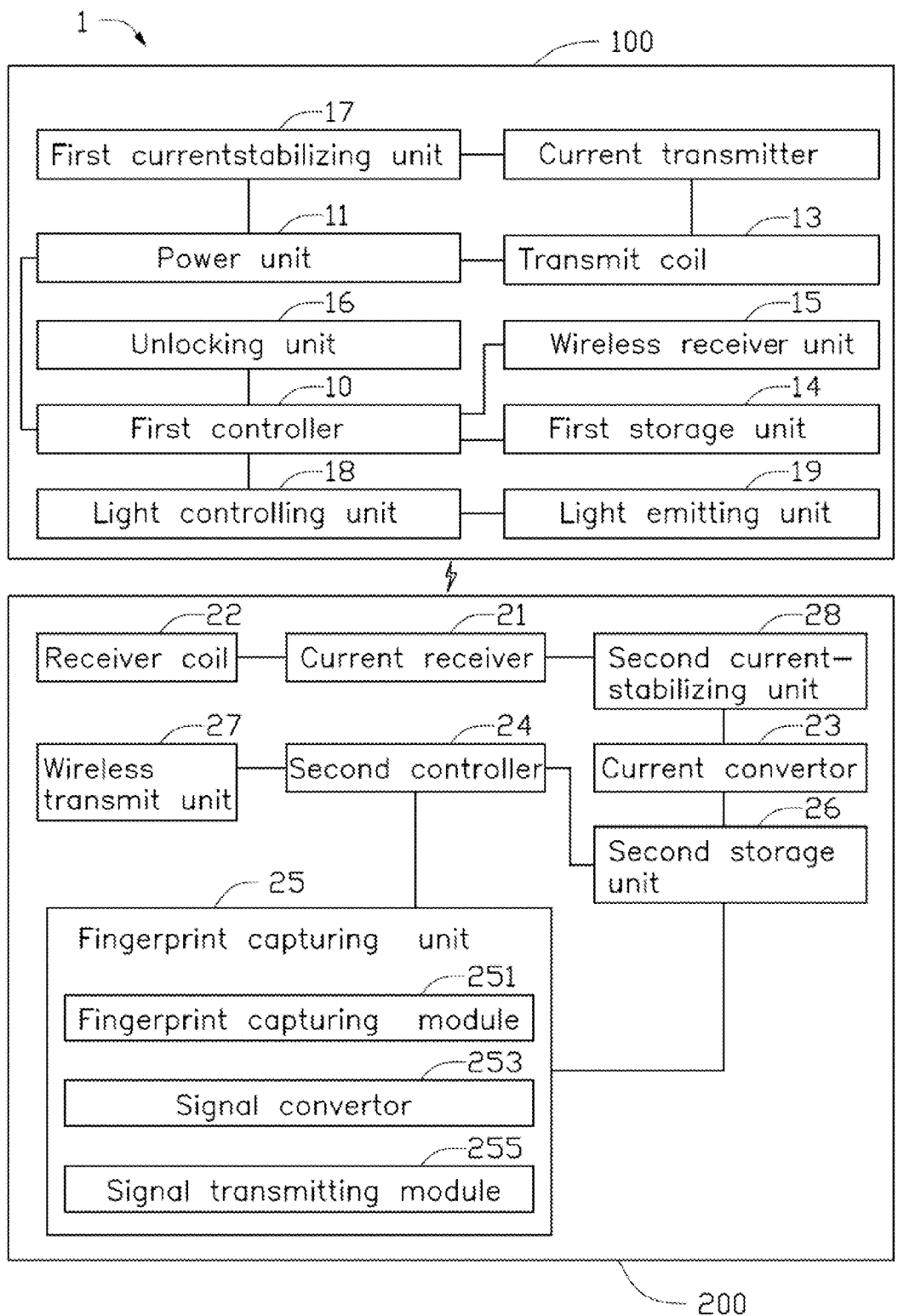
FIG. 1 is a block diagram of an embodiment of an intelligent entrance guard unlocking system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts may be exaggerated to better illustrate details and features of the present disclosure.

Definitions that apply throughout this disclosure will now be presented below.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 shows an intelligent entrance guard unlocking system 1 for a vehicle. The intelligent entrance guard unlocking system 1 can be run on but not limited to an intelligent entrance guard 100 and a powerless smart key 200. The intelligent entrance guard 100 can automatically power the powerless smart key 200 when a distance between the powerless smart key 200 and the intelligent entrance guard 100 is in an allowed range. A identity information can be captured by the powerless smart key 200 and transmitted by thereof to the intelligent entrance guard 100 for identification and reorganization.

The intelligent entrance guard 100 can include a first controller 10, a power unit 11, a current transmitter 12, a transmit coil 13, a first storage unit 14, a wireless receiver unit 15, and an unlocking unit 16. The first controller 10 can be coupled to the first storage unit 14. The power unit 11 can be used for supplying electric energy. The power unit 11 can be a battery. In other embodiments, the power unit 11 can be coupled with a power source. The current transmitter 12 can be electrically coupling the power unit 11 with the transmit coil 13. The wireless receiver unit 15 can be coupled to the first controller 10. The unlocking unit 16 can be coupled to the first controller 10.

The first storage unit 14 can be used to store a predefined identification code and a predefined fingerprint image. In at least one embodiment, the predefined identification code can be an identification code of a smart key matched with the intelligent entrance guard 100, and the fingerprint image can be an fingerprint image of a valid user of the intelligent entrance guard 100.

The powerless smart key 200 can include a current receiver 21, a receiver coil 22, a current convertor 23, a second controller 24, a fingerprint capturing unit 25, a second storage unit 26 and a wireless transmit unit 27. The current receiver 21 can be electrically coupled to the receiver coil 22 and configured to receive electric energy via the receiver coil 22, such that the powerless smart key 200 can be powered. The second controller 24 can be coupled to the wireless transmit unit 27 and the storage unit 26. The fingerprint capturing unit 25 can be coupled to the second storage unit 26.

The fingerprint capturing unit 25 can be used to capture a fingerprint image of a user. The fingerprint capturing unit 25 can be a camera.

The second storage unit 26 can be used to store the fingerprint image transmitted by the fingerprint capturing unit 25 and a unique identification code of the powerless smart key 200. In other embodiments, the second storage unit 26 of the powerless smart key 200 can be omitted, and the fingerprint image transmitted by the fingerprint capturing unit 25 and the unique identification code can be stored in a storage unit coupled to the powerless smart key 200.

The current transmitter 12 of the intelligent entrance guard 100 can transmit electric energy of the power unit 11 by wireless electromagnetic radiation via the transmit coil 13. The current receiver 21, if it is within a predefined distance of the transmit coil 13, can receive the electric energy via the receiver coil 22 and power the powerless smart key 200 using the received electric energy.

The powerless smart key 200, when being powered, is configured to be in a working mode. That is, the fingerprint capturing unit 25 can capture the fingerprint image of the user and store the fingerprint image in the second storage unit 26. The second controller 24 can obtain the unique identification code and the fingerprint image from the second storage unit 26 and control the wireless transmit unit 27 to transmit a wireless signal containing the unique identification code and the fingerprint image. The wireless receiver unit 15 of the intelligent entrance guard 100 can receive the wireless signal from the powerless smart key 200. The first controller 10 can obtain the unique identification code and the fingerprint image from the wireless signal. The first controller 10 can compare the unique identification code obtained from the wireless signal to the predefined identification code stored in the storage unit 14. The first controller 10 can also compare the fingerprint image obtained from the wireless signal to the predefined fingerprint image stored in the first storage unit 14 of the intelligent entrance guard 100. If the unique identification code matches the predefined identification code and the fingerprint image matches the predefined fingerprint image, the unlocking unit 16 of the intelligent entrance guard 100 can control to unlock the intelligent entrance guard 100, such as unlock intelligent entrance guard door (not shown) of the intelligent entrance guard 100.

The current transmitter 12 can electrically couple the power unit 11 with the transmit coil 13. In the embodiment, the current transmitter 12 can be a current transmission circuit, and used to optimize the electric energy received from the power unit 11. The current transmitter 12 can receive electric energy supplied by the power unit 11, filter noises of the received electric energy, and transmit the filtered electric energy in a way of wireless electromagnetic radiation via the transmit coil 13. In this embodiment, the electric energy can be alternating current.

The current receiver 21 can electrically couple with the receiver coil 22, and be used to receive the electric energy from the transmit coil 13 via the receiver coil 22. In the embodiment, the current receiver 21 can be a current receiving circuit, and is used to filter noises of the electric energy received from the receiver coil 22. The electric energy can be alternating current. The receiver coil 22 can be coupled with the transmit coil 13. The transmit coil 13 can cause the receiver coil 22 generate induced current in a form of electro-magnetic induction. The induced current can be alternating current.

The current convertor 23 can be used to convert the alternating current into direct current and power the powerless smart key 200 via the current.

The fingerprint capturing unit 25 can capture the fingerprint of the user and further store the fingerprint image in the second storage unit 26. The fingerprint capturing unit 25 can include a fingerprint capturing module 251, a signal convertor 253, and a signal transmitter 255. The fingerprint capturing module 251 can be used to capture the fingerprint image of the user. The signal convertor 253 can be used to convert the fingerprint image to be a fingerprint data under identify. The signal transmitter 255 can be used to transmit the fingerprint data under identify to the second storage unit 26. Furthermore, the fingerprint capturing module 251 can include a receiving screen positioned on the powerless smart key 200. The user put her or his fingertip on the receiving screen, and a fingerprint can be left on the receiving screen, and the fingerprint capturing module 251 can scan the fingerprint image. In an illustrated embodiment, the receiving screen is a touch screen. In other embodiment, the fingerprint capturing unit 25 can directly transmit the fingerprint image to the storage without converting.

The second controller 24 can electrically couple the second storage unit 26 with the wireless transmit unit 27 and be used to obtain the unique identification code and the fingerprint image from the second storage unit 26 after the powerless smart key 200 has been powered. Further, the second controller 24 can control the wireless transmit unit 27 to transmit the wireless signal containing the unique identification code and the fingerprint image.

The first controller 10 can electrically couple the wireless receiver unit 15 with the first storage unit 14 respectively and be used to receive the wireless signal via the wireless receiver unit 15. Additionally, the first controller 10 can obtain the unique identification code and the fingerprint image from the wireless signal and compare the predefined identification code obtained from the first storage unit 14 with the unique identification code. The first controller can compare the predefined fingerprint image obtained from the first storage unit 14 with the fingerprint image.

The unlocking unit 16 can control to unlock the intelligent entrance guard 100 when the unique identification code is matched with the predefined identification code and the fingerprint image is matched with the predefined fingerprint image. The unlocking unit 16 cannot control to unlock the intelligent entrance guard 100 when the unique identification code is not matched with the predefined identification code and/or the fingerprint image is not matched with the predefined fingerprint image.

In at least one embodiment, the intelligent entrance guard 100 can further include a first current-stabilizing unit 17. The first current-stabilizing unit 17 can electrically couple the power unit 11 with the current transmitter 12, and be used to stabilize the current of the power unit 11 to prevent the current to exceed a predefined value suddenly, which may damage the electronic components of the intelligent entrance guard 100.

In at least one embodiment, the intelligent entrance guard 100 can further include a light controlling unit 18 and a light emitting unit 19. The light controlling unit 18 can electrically couple the first controller 10 with the light emitting unit 19. The light controlling unit 18 can be used to control the light emitting unit 19 to emit light with one color to prompt the user that the verification is successful when the unique identification code is matched with the predefined identification code and the fingerprint image is matched with the predefined fingerprint image. The light controlling unit 18 can further control the light emitting unit 19 to emit light with another color to prompt the user that the verification is unsuccessful when the unique identification code is not matched with the predefined identification code and/or the fingerprint image is not matched with the predefined fingerprint image.

In at least one embodiment, the powerless smart key 200 can further include a second current-stabilizing unit 28. The second current-stabilizing unit 28 can couple the current receiver 21 with the current convertor 23 and be used to stabilize the current of the received alternating current to prevent the current to exceed a predefined value suddenly, which may damage the electronic components of the powerless smart key 200.

In at least one embodiment, if the received electric energy is direct current, the current convertor 23 can be thus omitted.

In at least one embodiment, the unique identification code matched with the predefined identification code can be that the unique identification code is equal to the predefined identification code and/or the unique identification code is uniquely corresponding to the predefined identification code.

In at least one embodiment, the fingerprint image matched with the predefined fingerprint image can be that the fingerprint image is same to the fingerprint image and/or the fingerprint image is uniquely corresponding to the fingerprint image.

The above verification process can include the verification of the identification code and the verification of the fingerprint image. In at least one embodiment, and the verification of the identification code can be omitted. Therefore, the second controller 24 can control the wireless transmit unit 27 to transmit the wireless signal containing the fingerprint image. The first controller 10 can compare the predefined fingerprint image obtained from the first storage unit 14 with the fingerprint image. The unlocking unit 16 can control to unlock the intelligent entrance guard 100 when the fingerprint image is matched with the predefined fingerprint image. The unlocking unit 16 cannot control to unlock the intelligent entrance guard 100 when the fingerprint image is not matched with the predefined fingerprint image. The light controlling unit 18 can control the light emitting unit 19 to emit light with one color to prompt the user that the verification is successful when the fingerprint image is matched with the predefined fingerprint image, and further control the light emitting unit 19 to emit light with another color to prompt the user that the verification is unsuccessful when the fingerprint image is not matched with the predefined fingerprint image.

Figure 2:
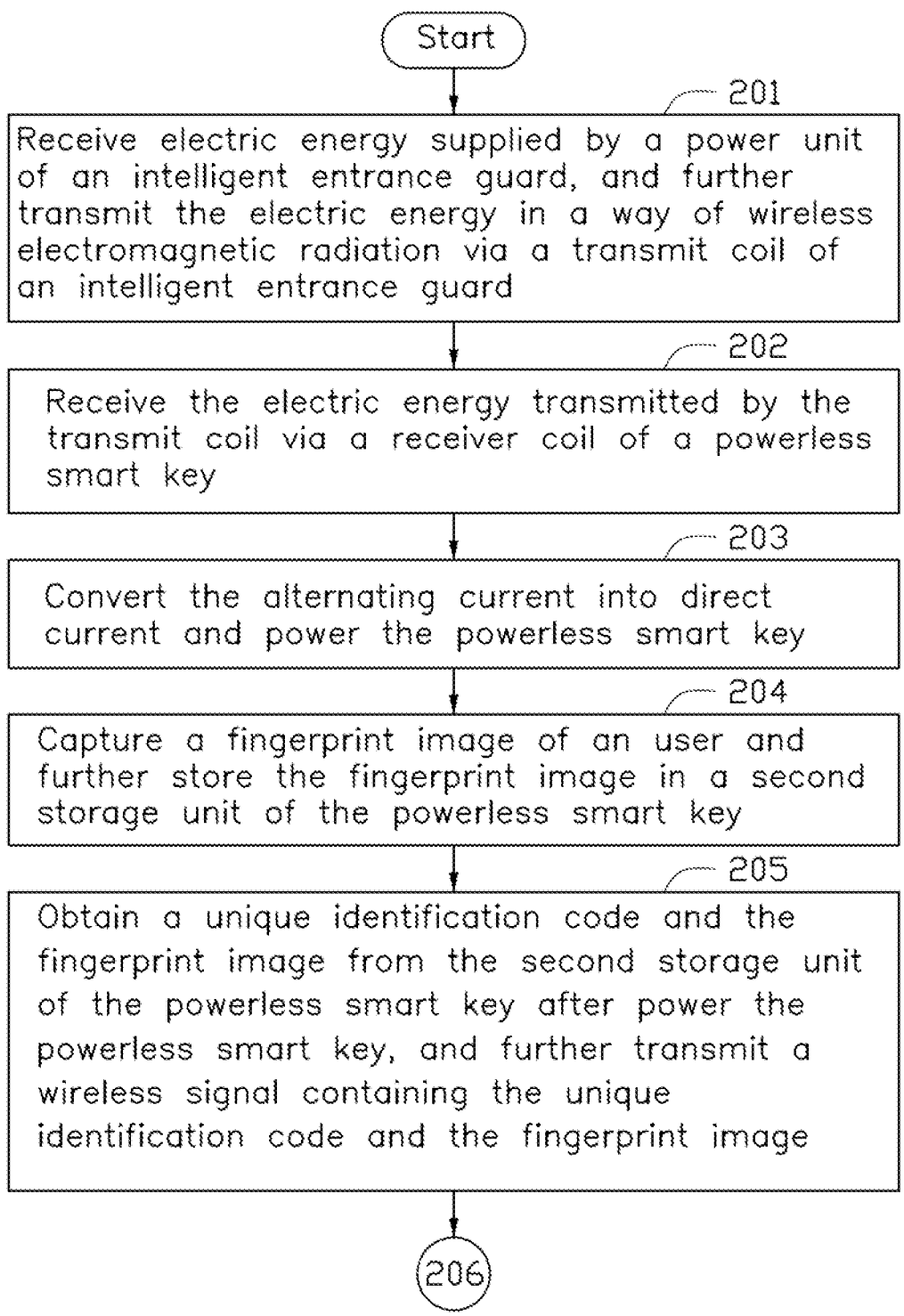
FIGS. 2 and 3 cooperatively constitute a signal flowchart of an embodiment of an intelligent entrance guard unlocking method.
Figure 3:
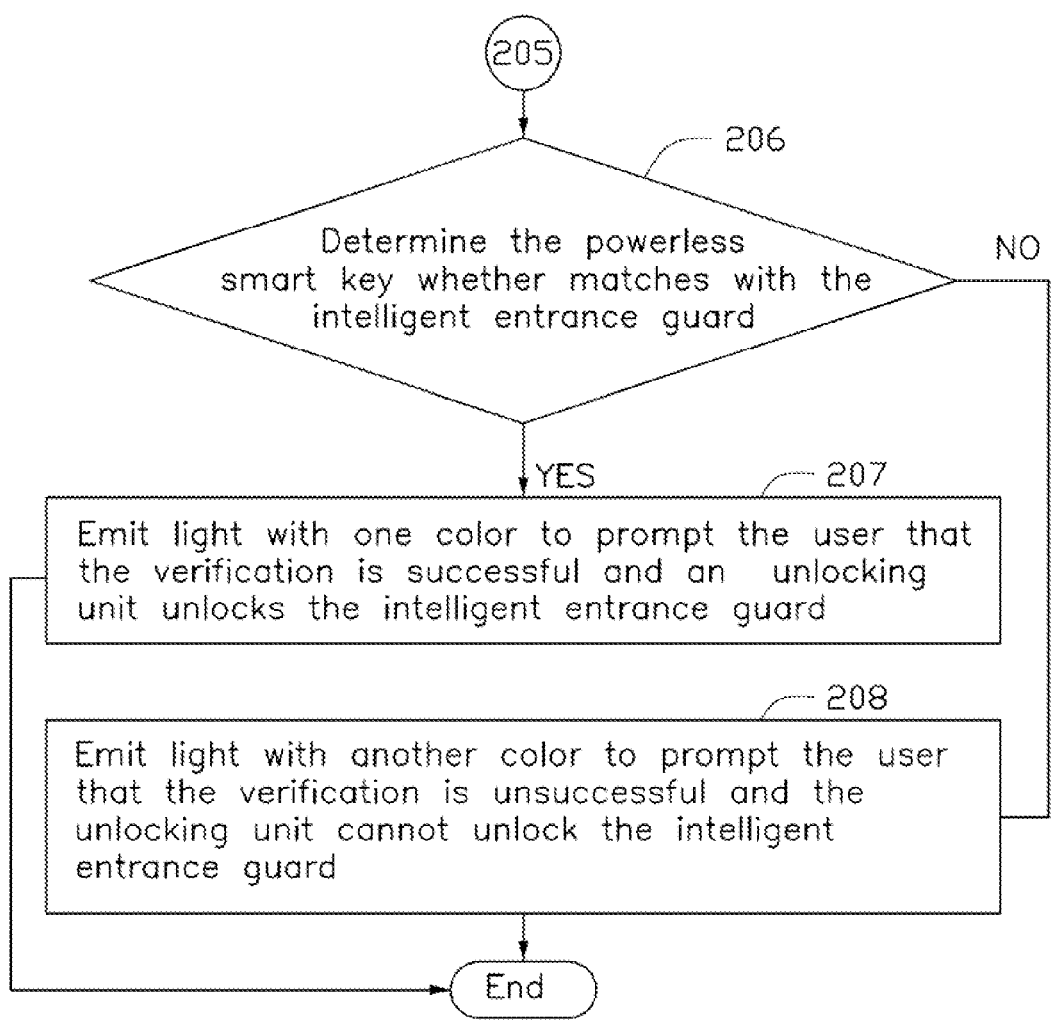

The intelligent entrance guard unlocking method is provided by way of example, as there are a variety of ways to carry out the method. The control method described below can be carried out using the configurations illustrated in FIG. 1, for example, and various elements of these figures are referenced in explaining the example method. Each block shown in FIGS. 2 and 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

Referring to FIG. 2, at block 201, a current transmitter of an intelligent entrance guard receives electric energy supplied by a power unit of the intelligent entrance guard, and further transmits the electric energy in a way of wireless electromagnetic radiation via a transmit coil of the intelligent entrance guard, and the electric energy is alternating current. The current transmitter of the intelligent entrance guard can electrically couple the power unit with a transmit coil of the intelligent entrance guard. In the embodiment, the current transmitter can be a current transmission circuit, and used to optimize the electric energy received from the power unit. The current transmitter can receive electric energy supplied by the power unit, filter noises of the received electric energy, and transmit the filtered electric energy in a way of wireless electromagnetic radiation via the transmit coil. In this embodiment, the electric energy can be alternating current.

At block 202, a current receiver of powerless smart key receives the electric energy transmitted by the transmit coil via a receiver coil of a powerless smart key, and the electric energy is alternating current. The current receiver can be electrically coupled to the receiver coil. The current receiver can receive electric energy from the transmit coil when the current receiver is within a predefined distance of the transmit coil.

At block 203, a current convertor of the powerless smart key converts the alternating current into direct current and power the powerless smart key via the received electric energy as if the powerless smart key is powered by a battery of itself At block 204, a fingerprint capturing unit of the powerless smart key captures a fingerprint image and further stores the fingerprint image in a second storage unit of the powerless smart key.

At block 205, a second controller of the powerless smart key obtains a unique identification code and the fingerprint image from the second storage unit of the powerless smart key after the powerless smart key has been powered, and further controls a wireless transmit unit to transmit a wireless signal containing the unique identification code and the fingerprint image.

Referring to FIG. 3, at block 206, a first controller determines the powerless smart key whether matches with the intelligent entrance guard, if yes, the process goes to block 207, otherwise, the process goes to block 208. The first controller receives the wireless signal via a wireless receiver unit of the intelligent entrance guard. The first controller obtains the unique identification code and the fingerprint image from the wireless signal. The first controller compares a predefined identification code obtained from a first storage unit of the intelligent entrance guard with the unique identification code, and further compares a predefined fingerprint image obtained from the first storage unit of the intelligent entrance guard with the fingerprint image. The first controller determines whether the unique identification code is matched with the predefined identification code and the fingerprint image is matched with the predefined fingerprint image, if yes, the process goes to block 207, otherwise, the process goes to block 208.

At block 207, a light controlling unit of the intelligent entrance guard controls a light emitting unit of the intelligent entrance guard to emit light with one color to prompt the user that the verification is successful and an unlocking unit of the intelligent entrance guard unlocks the intelligent entrance guard.

At block 208, the light controlling unit controls the light emitting unit of the intelligent entrance guard to emit light with another color to prompt the user that the verification is unsuccessful and the unlocking unit cannot unlock the intelligent entrance guard.

In other embodiments, the fingerprint capture module 231 can be designed to be in other structure, for example, the fingerprint capture module 231 is a camera.

In other embodiments, the unlocking system for the intelligent entrance guard 100 is not limited to apply in a building, it can be used in other areas desiring identify reorganization for safety, such as unlocking for a vehicle, a box, a cabinet, an electronic device.

The embodiments shown and described above are only examples. Many details are often found in the art such as the other features of an intelligent entrance guard unlocking system and unlocking method thereof. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A powerless smart key comprising:
   a receiver coil;
   a current receiver electrically coupled to the receiver coil, and configured to receive electric energy via the receiver coil such that the powerless smart key is powered directly by the received electric energy and then the powerless smart key works;
   a fingerprint capturing unit coupled to a storage unit and configured to obtain a fingerprint image of a user and further store the fingerprint image in the storage unit;
   a controller configured coupled to a wireless transmit unit with the storage unit and configured to control the wireless transmit unit to transmit a wireless signal containing the fingerprint image to an intelligent entrance guard unlocking system;
   a current convertor electrically coupling the current receiver with the controller; and
   a current-stabilizing unit electrically couple the current receiver with the current convertor and configured to stabilize current of the received electric energy to prevent the current to exceed a predefined value suddenly;
   wherein, another controller of the intelligent entrance guard unlocking system is configured for receiving the wireless signal, and determining whether the powerless smart key is matched with the intelligent entrance guard unlocking system according to the fingerprint image.

2. The powerless smart key of claim 1, wherein the storage unit further stores an identification code of the powerless smart key, the wireless signal further contains the identification code, and the intelligent entrance guard is capable of receiving the wireless signal, and determining whether the powerless smart key is matched with the intelligent entrance guard according to the fingerprint image and the identification code.

3. The powerless smart key of claim 1, further comprising the current convertor is configured to convert alternating current of electric energy into direct current so as to power the powerless smart key.

4. An intelligent entrance guard unlocking system comprising:
   a power unit configured for supplying electric power;
   a current transmitter electrically coupling the power unit with a transmit coil, configured to receive electric energy supplied by the power unit and transmit the electric energy in a way of wireless electromagnetic radiation via the transmit coil;
   a first controller coupled to power unit;
   a first storage unit coupled to the first controller, and configured for storing a predefined fingerprint image;
   a wireless receiver unit coupled to the first controller;
   an unlocking unit coupled to the first controller; and
   a powerless smart key comprising:
      a receiver coil;
      a current receiver electrically coupled to the receiver coil and configured to receive the electric energy via the receiver coil such that the powerless smart key is powered directly by the received electric energy and then the powerless smart key works;
      a fingerprint capturing unit coupled to a second storage unit, and configured to obtain a fingerprint image of the user and further store the fingerprint image in the second storage unit;
      a second controller coupled to a wireless transmit unit with the second storage unit and configured to control the wireless transmit unit to transmit a wireless signal containing the fingerprint image to the intelligent entrance guard;
      a current convertor electrically coupling the current receiver with the second controller; and
      a first current-stabilizing unit electrically coupling the current receiver with the current convertor and configured to stabilize current of the received electric energy to prevent the current to exceed a predefined value suddenly;
   wherein, the wireless receiver unit receives the wireless signal, the first controller is configured to obtain the predefined fingerprint image from the first storage unit and compare the fingerprint image with the predefined fingerprint image, and the unlocking unit is configured to unlock when the fingerprint image matches with the predefined fingerprint image.

5. The intelligent entrance guard unlocking system of claim 1, wherein the intelligent entrance guard unlocking system further comprises a light controlling unit and a light emitting unit, the light controlling unit electrically couples the first controller with the light emitting unit and is configured to control the light emitting unit to emit light with one color when the fingerprint image matches with the predefined fingerprint image and further control the light emitting unit to emit light with another color when the fingerprint image does not match with the predefined fingerprint image.

6. The intelligent entrance guard unlocking system of claim 1, wherein the first storage unit further stores a predefined identification code, and the second storage unit further stores an identification code of the powerless smart key, the wireless signal further contains the identification code, and the first controller is further configured to obtain the predefined identification code from the first storage unit and compare the identification code with the predefined identification code, and the unlocking unit is configured to unlock when the fingerprint image matches with the predefined fingerprint image and the identification code matches with the predefined identification code, and the unlocking unit is configured to not unlock when the fingerprint image does not match with the predefined fingerprint image or the identification code does not match with the predefined identification code.

7. The intelligent entrance guard unlocking system of claim 6, wherein the intelligent entrance guard unlocking system further comprises a light controlling unit and a light emitting unit, the light controlling unit electrically couples the first controller with the light emitting unit, and is configured to control the light emitting unit to emit light with one color when the fingerprint image matches with the predefined fingerprint image and the identification code matches with the predefined identification code, and further control the light emitting unit to emit light with another color when the fingerprint image does not match with the predefined fingerprint image or the identification code does not match with the predefined identification code.

8. The intelligent entrance guard unlocking system of claim 1, wherein the intelligent entrance guard unlocking system further comprises a second current-stabilizing unit electrically coupling the power unit with the current transmitter and configured to stabilize current of the power unit to prevent the current to exceed a predefined value suddenly.

9. The intelligent entrance guard unlocking system of claim 1, wherein the current convertor is configured to convert alternating current of electric energy into direct current so as to power the powerless smart key.

10. An intelligent entrance guard unlocking method comprising:
   transmitting electric energy of a power unit of an intelligent entrance guard in a way of wireless electromagnetic radiation via a transmit coil;
   receiving the electric energy via a receiver coil of a powerless smart key such that the powerless smart key is powered directly by the received electric energy and then the powerless smart key works;
   stabilizing current of the received electric energy to prevent the current to exceed a predefined value suddenly;
   capturing a fingerprint image of an user and further storing the fingerprint image in a second storage unit of the powerless smart key;
   controlling a wireless transmit unit of the powerless smart key to transmit a wireless signal containing the fingerprint image to the intelligent entrance guard;
   obtaining a predefined fingerprint image from a first storage unit of the intelligent entrance guard and comparing the fingerprint image with the predefined fingerprint image;
   unlocking the intelligent entrance guard when the fingerprint image matches with the predefined fingerprint image; and
   not unlocking the intelligent entrance guard when the fingerprint image does not match with the predefined fingerprint image.

11. The intelligent entrance guard unlocking method of claim 10, further comprising:
   controlling a light emitting unit of the intelligent entrance guard to emit light with one color when the fingerprint image matches with the predefined fingerprint image; and
   controlling the light emitting unit to emit light with another color when the fingerprint image does not match with the predefined fingerprint image.

12. The intelligent entrance guard unlocking method of claim 10, wherein the wireless signal further contains the identification code, the intelligent entrance guard unlocking method further comprises:
   obtaining a predefined identification code from the first storage unit;
   comparing the identification code with the predefined identification code;
   unlocking the intelligent entrance guard when the fingerprint image matches with the predefined fingerprint image and the identification code matches with the predefined identification code; and
   not unlocking the intelligent entrance guard when the fingerprint image does not match with the predefined fingerprint image or the identification code does not match with the predefined identification code.

13. The intelligent entrance guard unlocking method of claim 12, further comprising:
   controlling a light emitting unit of the intelligent entrance guard to emit light with one color when the fingerprint image matches with the predefined fingerprint image and the identification code matches with the predefined identification code; and
   controlling the light emitting unit to emit light with another color when the fingerprint image does not match with the predefined fingerprint image or the identification code does not match with the predefined identification code.

14. The intelligent entrance guard unlocking method of claim 10, further comprising:
   stabilizing current of the power unit to prevent the current to exceed a predefined value suddenly.

15. The intelligent entrance guard unlocking method of claim 10, further comprising:
   converting alternating current of the electric energy into direct current so as to power the powerless smart key.

* * * * *